Nov. 21, 1933.  E. W. COLE  1,936,105

GUANO DISTRIBUTOR

Filed Feb. 12, 1932

E. W. Cole,
Inventor

Patented Nov. 21, 1933

1,936,105

UNITED STATES PATENT OFFICE 1,936,105

GUANO DISTRIBUTOR

Elisha W. Cole, Charlotte, N. C.

Application February 12, 1932. Serial No. 592,551

5 Claims. (Cl. 221—120)

This invention relates to a guano distributor having a stationary hopper and a fixed bottom member therein, with a rotary member mounted on the top surface of the bottom member, said rotary member comprising two disks mounted in spaced relation to each other and forming a space therebetween into which the guano is adapted to fall through perforations in the top disk, in combination with means mounted on the hopper and penetrating an opening in the hopper and projecting into the space between the disks for deflecting guano out of the hopper in a definite quantity, regardless of the moisture content or the fineness of the guano.

Another object of this invention is to provide a guano distributor having a fixed bottom with a rotary member mounted on the upper surface of said fixed bottom member, said rotary member comprising two disks mounted in spaced relation to each other and adapted to rotate together, said upper disk having perforations therein, through which the guano is adapted to fall into the space between the two disks from whence it is deflected by suitable deflecting means to the outside of the hopper in a definite quantity, regardless of the condition of the guano as to fineness or moisture content.

Another object of this invention is to provide a guano distributor having a stationary hopper with a fixed bottom member therein, and having a rotary member mounted on the lower portion of said hopper, with said rotary member comprising two circular plates having their outer portions disposed in spaced relation to each other, thus forming a space therebetween into which guano can fall through perforations in the upper plate onto the lower plate, with deflecting means mounted in an opening in the hopper for deflecting the guano from between the two plates to the exterior of the hopper, from whence it is directed to the ground as desired. A suitable scraper is also fixedly mounted within the hopper for deflecting the guano from the walls of the hopper towards the central portion thereof.

Another object of this invention is to provide a guano distributor wherein means are employed for delivering a definite quantity of guano, regardless of the dryness or wetness of the guano, and also regardless of the extent to which the guano is reduced as to fineness.

Some of the objects of the invention having been stated, a more detailed description of the same will appear, when taken in connection with the accompanying drawing, in which—

Figures 1, 2:
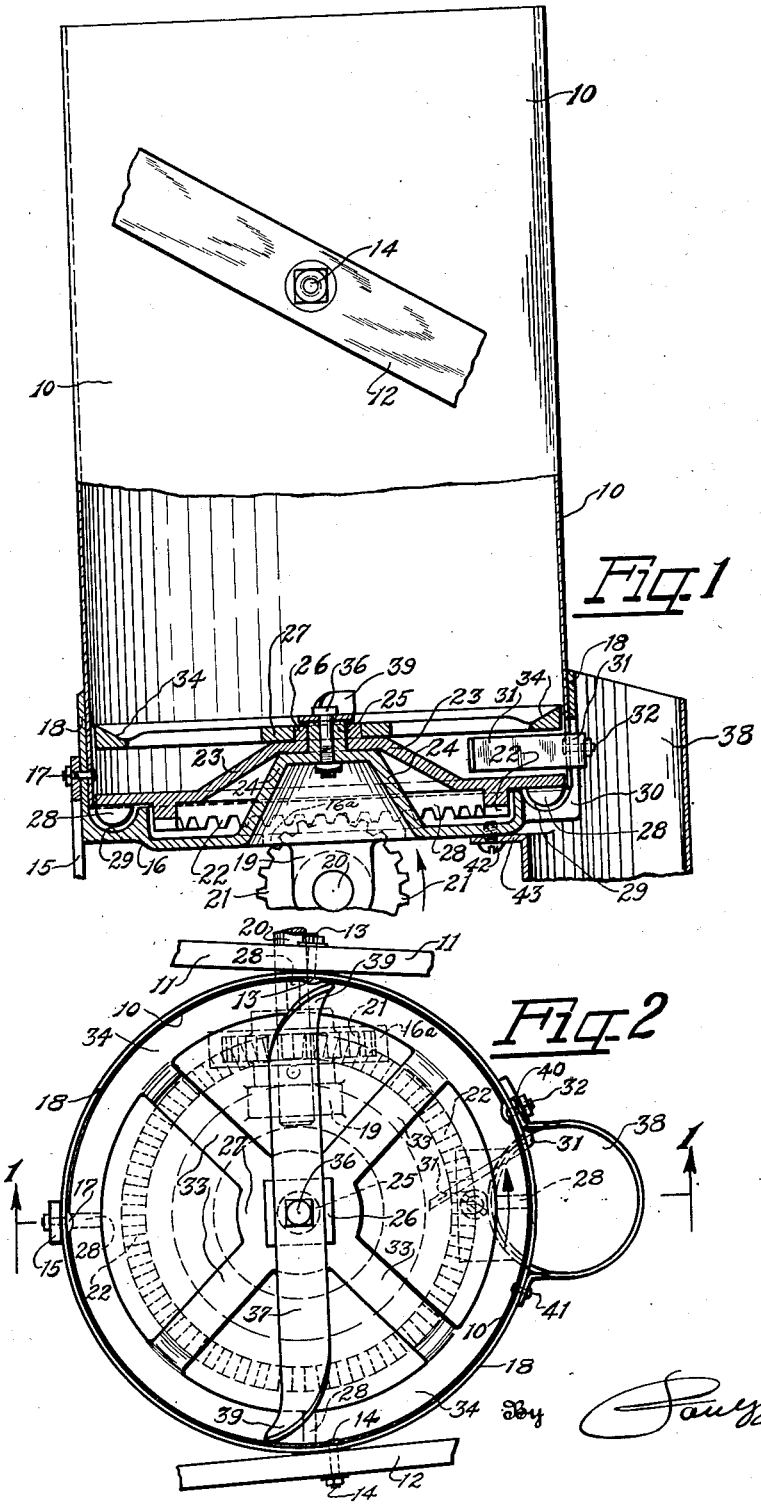
Figure 1 is a side elevation of my hopper, with the lower portion thereof in vertical section taken along the line 2—2 in Figure 2.
Figure 2 is a top plan view of my guano distributor.

Referring more particularly to the drawing, the numeral 10 indicates a guano distributor hopper which is secured to handles 11 and 12 by any suitable means such as bolts 13 and 14. The lower portion of the hopper is secured to the framework of the guano distributor (not shown) by any suitable means, such as brackets 15, one of which is shown in Figure 1.

The hopper 10 has a bottom member 16 secured therein by any suitable means, such as bolts 17 penetrating the hopper 10 and the flange 18, which flange is integral with the outer edge of bottom member 16. The bottom member 16 has a lug 19 disposed on the lower surface thereof, in which is rotatably mounted a shaft 20. The other end of the shaft 20 is rotatably mounted in any suitable means, not shown, such as in the framework of the distributor. This shaft is adapted to be driven in the direction indicated by the arrow, by the ground wheel of the guano distributor, not shown, but of conventional structure.

The shaft 20 has a pinion 21 mounted thereon, which is adapted to engage a gear 22 integral with the lower surface of a rotary member 23. The fixed bottom member 16 has an opening 16a in which pinion 21 has movement to engage the gear 22.

The bottom member 16 has an upwardly projecting central portion 24 having a round bearing portion 25 projecting upwardly therefrom, on which is rotatably mounted the rotary member 23. The rotary member 23 has a squared projection 26 integral therewith over which is fitted a second rotary member 27, which is adapted to rotate at all times with rotary member 23.

On the upper surface of stationary bottom member 16, and near the outer rim thereof, is a circular groove 29, into which a plurality of projections 28 on the lower surface of rotary member 23 are adapted to have movement to drag the guano which may pass by the rotary members 23 and 27 to cause this guano to fall into an opening 30 in the bottom member 16 and the rim or flange portion 18.

A deflector or scraper 31 is mounted as at 32 on the exterior of the hopper and projects into the space between the rotary members 23 and 27 and serves to deflect the guano out of the hopper into spout 38.

Rotary member 27 has spokes 33 connecting the rim and hub portions thereof. The guano is adapted to fall between the spokes onto the member 23. These spokes 33 serve to break up lumps of guano. The rim portion of member 27 slopes inwardly as shown at 34, so as to deflect the guano inwardly into the opening occurring between the spokes 33.

Projection 25 on bottom member 16 projects slightly above the upper surface of member 27 and a bolt 36 penetrates this projection 25, said bolt also penetrating a wiper 37 and fixedly secures said wiper to the bottom member 16, so that as members 23 and 27 are rotated, the end portions 39 of wiper 37, which are twisted, will deflect the guano from the sidewalls of hopper 10 and direct it inwardly towards the center of the hopper.

The spout 38 is secured over the opening 30 and the deflector 31 deflects the guano from between members 23 and 27 into said spout. The spout 38 is secured to the hopper 10 by any suitable means such as bolts 40 and 41 penetrating the sidewalls of the hopper and the flanged portion 18 of bottom member 16. The screw 42 also serves to secure the spout 38 in position, being disposed in lip 43 of spout 38.

In the drawing and specification there has been set forth a preferred embodiment of the invention, and although specific terms are employed, they are used in a generic and specific sense only, and not for purposes of limitation, the scope of the invention being set forth in the appended claims.

I claim:

1. In a guano distributor having a fixed hopper and a fixed bottom member therein, said bottom member having a centrally disposed bearing on the upper side thereof, a rotary member mounted on said bearing, a second rotary member mounted on said first rotary member for movement therewith, the upper rotary member having openings therein through which the guano may fall to the lower rotary member, means for deflecting the guano from between the two rotary members to the exterior of the hopper, said fixed bottom member having an opening therein, said first rotary member having a concentric gear on the lower surface thereof, a driven gear mounted below said fixed bottom member and projecting through said opening in said bottom member and engaging said concentric gear, said bearing on said bottom member projecting above said second rotary member and a scraper fixedly secured on the upper end of said bearing member, the upper rotary member having a circular rim portion disposed in close proximity to the inner sidewalls of the hopper and the upper surface of said rim portion being beveled to slope inwardly to deflect guano from the sidewalls of the hopper.

2. Guano distributing means comprising a fixed hopper, a fixed bottom member in said hopper, said bottom member having a centrally disposed bearing on the upper side thereof, a rotary member mounted for rotation on said bearing, said rotary member comprising two spaced disks with the upper disk having openings therein, means for deflecting guano from between the disks to the exterior of the hopper, said fixed bottom having an opening therein, said rotary member having a gear on the lower surface thereof, a driven pinion mounted below said fixed bottom member and projecting through said opening and engaging said gear, said bearing on said bottom projecting above said upper plate of said rotary member and having a scraper fixedly secured thereon, said hopper having a hole in the side thereof, a scraper extending thru said hole and into the space between the two spaced disks, the rim portion of the upper disk being beveled inwardly.

3. In a guano distributor having a stationary hopper, a bottom secured in said hopper, a rotatable member mounted on the upper side of said bottom member, said rotatable member comprising two spaced upper and lower disks, said hopper having an opening therein, a deflector secured on said hopper and projecting through said opening and between the spaced disks, said bottom member having an opening therein, driving means extending through said opening in the bottom member, and means on the lower surface of said rotatable member for engagement with said driving means, said upper disk having a continuous rim portion beveled on its upper side to deflect guano away from the sidewalls of the hopper, said upper disk also having openings therein thru which the guano may fall onto the lower disk.

4. In a guano distributor, a hopper, a bottom member fixedly secured in said hopper and having an opening therein, said bottom member having a centrally disposed raised portion, a bearing on the upper side of said raised portion, a rotatable member mounted on said bearing and having a gear on the lower surface thereof, a driven pinion projecting through said opening in said bottom member and meshing with said gear on said rotatable member for driving the same, an upper perforated disk mounted on the rotatable member and having its outer portion in spaced relation to the rotatable member, said hopper having an opening in the side thereof, a deflector secured to the hopper and projecting into the hopper through said opening in the hopper between the rotatable member and said upper disk for deflecting guano from said rotatable member to the exterior of the hopper, said upper disk having a rim portion provided with an inwardly sloping upper surface.

5. In a guano distributor, a hopper, a fixed bottom in said hopper, a rotatable member mounted in the lower portion of said hopper, said rotatable member comprising two spaced disks, the upper disk having openings therein through which the guano can pass to lodge on the lower disk and having the upper side of its rim portion sloping inwardly, said hopper having an opening in the side thereof, a deflector secured to said hopper and projecting into the hopper between the spaced disks for deflecting the guano out of the hopper, said fixed bottom having an opening therein, a driven gear mounted below the fixed bottom and projecting through said opening, a gear on the lower surface of said lower disk adapted to be engaged by said driven gear for driving the rotatable member.

ELISHA W. COLE.